US009696924B2

(12) United States Patent
Mari et al.

(10) Patent No.: US 9,696,924 B2
(45) Date of Patent: *Jul. 4, 2017

(54) CONCURRENT VIRTUAL STORAGE MANAGEMENT

(71) Applicant: International Business Machines Corporation, Armonk, NY (US)

(72) Inventors: Charles E. Mari, Wappingers Falls, NY (US); Harris M. Morgenstern, Wappingers Falls, NY (US); Thomas F. Rankin, Tillson, NY (US); Peter J. Relson, Ulster Park, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,556

(22) Filed: Mar. 14, 2016

(65) Prior Publication Data

US 2017/0090789 A1 Mar. 30, 2017

Related U.S. Application Data

(63) Continuation of application No. 14/871,265, filed on Sep. 30, 2015.

(51) Int. Cl.
| | |
|---|---|
| *G06F 12/00* | (2006.01) |
| *G06F 3/06* | (2006.01) |
| *G06F 12/1009* | (2016.01) |
| *G06F 12/0811* | (2016.01) |
| *G06F 12/0815* | (2016.01) |

(52) U.S. Cl.
CPC .......... *G06F 3/0619* (2013.01); *G06F 3/0659* (2013.01); *G06F 3/0685* (2013.01); *G06F 12/0811* (2013.01); *G06F 12/0815* (2013.01); *G06F 12/1009* (2013.01); *G06F 2212/60* (2013.01); *G06F 2212/621* (2013.01)

(58) Field of Classification Search
None
See application file for complete search history.

(56) References Cited

U.S. PATENT DOCUMENTS

2006/0036789 A1* 2/2006 Lee .................. G06F 9/524
710/200
2012/0284477 A1* 11/2012 Gainey, Jr. .......... G06F 9/30003
711/166

OTHER PUBLICATIONS

IBM, z/Architecture Principles of Operation, Tenth Edition, Sep. 2012, document No. SA22-7832-09.*

(Continued)

*Primary Examiner* — Ryan Bertram
*Assistant Examiner* — Jason Blust
(74) *Attorney, Agent, or Firm* — Cantor Colburn LLP; William A. Kinnaman, Jr.

(57) ABSTRACT

A memory system is configured for access by a plurality of computer processing units. An address lock bit is configured in a translation table of the memory system. The address lock supports both address lock shared and address lock exclusive functions. A storage manager of an operating system configured to obtain exclusive access to an entry in a DAT table either by obtaining an address space lock exclusive or obtaining an address space lock shared, and setting a lock bit in a DAT entry.

7 Claims, 4 Drawing Sheets

(56) References Cited

OTHER PUBLICATIONS

Charles E. Mari et al., "Concurrent Virtual Storage Management,"
U.S. Appl. No. 14/871,265, filed Sep. 30, 2015.
List of IBM Patents or Patent Applications Treated as Related;
(Appendix P), Filed Mar. 17, 2016, 2 pages.

* cited by examiner

_US 9,696,924 B2_

CONCURRENT VIRTUAL STORAGE MANAGEMENT

DOMESTIC PRIORITY

This application is a continuation of U.S. patent application Ser. No. 14/871,265, entitled "CONCURRENT VIRTUAL STORAGE MANAGEMENT," filed Sep. 30, 2015, the disclosure of which is incorporated by reference herein in its entirety.

BACKGROUND

The present invention relates to memory management and, more specifically, to management of concurrent access to virtual memory data structures.

Dynamic address translation (DAT) is used in many computer architectures to implement a mapping between a virtual address and real address. The virtual address represents a layer of indirection between an application and the underlying hardware that provides the application with abstraction of a contiguous range of storage, as well as provides more storage than the actual amount of random access memory available in a system configuration. Many computer architectures employ a multi-level DAT hierarchy to implement virtual memory in order to reduce the amount of storage required for DAT tables.

SUMMARY

An embodiment includes a memory system configured for access by a plurality of computer processing units. An address lock bit is configured in a translation table of the memory system. The address lock supports both address lock shared and address lock exclusive functions. A storage manager of an operating system is configured to obtain exclusive access to an entry in a DAT table either by obtaining an address space lock exclusive or obtaining an address space lock shared, and setting a lock bit in a DAT entry.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1A:
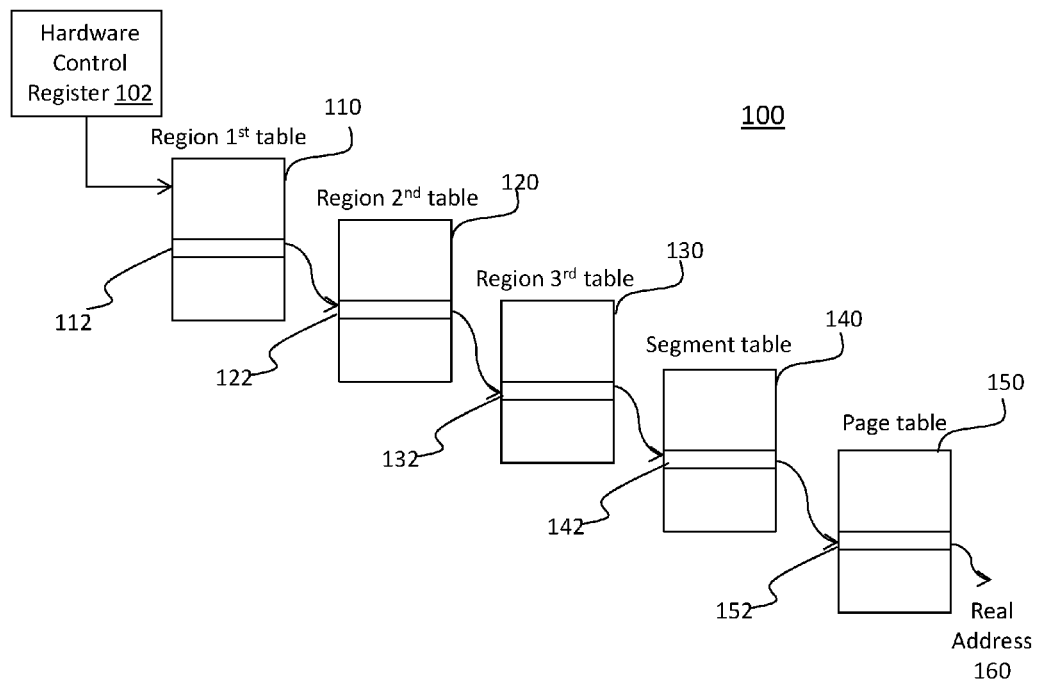
FIG. 1A is a block diagram of a memory mapping architecture in accordance with an embodiment.

A memory mapping architecture may employ a multi-level hierarchy of storage components. As shown, e.g., in FIG. 1A, a five-level hierarchy 100 of z/Architecture for IBM mainframe computers provides through a hardware control register 102, a region first table 110 in the first level of the hierarchy. The region first table includes a region first index 112 that points to a region second table 120 in the second level of the hierarchy. The region second table 120 includes a region second index 122 that points to a region third table 130 in the third level in the hierarchy. The region third table 130 includes a region third index 132 that points to a segment table 140 in the fourth level. The segment table 140 includes a segment table index 142 that points to a page table 150 in the fifth level of the hierarchy. The page table 150 (which is the lowest level in the hierarchy) includes a page table index 152 that contains a real address 160.

Figure 1B:
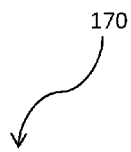
FIG. 1B is depicts a virtual storage address translation structure that may be implemented using the memory mapping architecture of FIG. 1A in an embodiment.

A virtual storage address translation structure 170 for the hierarchy 100 is shown in FIG. 1B, in which RFX refers to the region first index 112, RSX refers to the region second index 122, and RTX refers to the region third index 132. In addition, SX refers to the segment table index 142, PX refers to the page table index 152, and BX refers to a base index. It will be understood that other memory mapping architectures may be employed to realize the advantages of the embodiments described herein. For example, an alternative memory mapping scheme may employ an inverted page table where a process identifier and virtual address pair is converted to a real address, e.g., by means of a hashing scheme.

The following terminology is presented herein to provide a better understanding of aspects of the embodiments.

Page fault. A page fault represents an event where an application accesses a page of storage which is not backed up in a real frame. The data may exist in some other medium normally referred to as auxiliary storage or it may be storage that has no data associated with it (e.g., a first reference). In the former case, the operating system is responsible for obtaining a frame and initiating input I/O to bring the data into real storage and for suspending the unit of work until the I/O has completed. In the latter case, a frame must be obtained and cleared, and the real address of the frame must be stored in the page table entry.

Page stealing. Page stealing is employed by the operating system when the number of available real frames is below some critical threshold. The operating system attempts to select frames which are unlikely to be referenced in the near future and page them out to auxiliary storage. Once the output I/O completes, the frame is freed and the total pool of available frames increases.

Page fixing. Page fixing is a way for an application program to establish a virtual to real bind on a page of storage. When a page is fixed it is not a steal candidate and operations such as I/O that require the page to remain in real storage for the duration of the operation can be performed.

Many operating systems lock down all page level operations within an address space for all or parts of the entire duration of a page fault, segment fault or other events that affect DAT structures. As processes become more multi-threaded and computer architectures support larger numbers of CPUs, it becomes increasingly important for the operating system to support concurrent page or segment operations within a single address space. In IBM's z/OS operating system, such operations currently obtain exclusive access to an address space lock referred to as a Real Storage Manager Address (RSMAD) lock which prevents any concurrent storage related activity to occur within an address space. Transitioning from a scheme of mutual exclusion to one where multiple events are processed concurrently can represent a major change to the operating system's architecture, requiring code changes to every address space level real storage management function, even the ones that are not performance sensitive. The embodiments described herein provide a technique for supporting intra-address space level parallelism for the performance critical parts of address space level storage management. Embodiments also provide a means of introducing changes in a piecemeal manner so that an agile software development process can be employed.

Memory managers typically serialize their processing on the dynamic address translation (DAT) structures of an address space basis by using a lock. When the lock is held, all other virtual memory related activities for the address space are forced to wait for the lock owner to free the lock before proceeding. When there are multiple threads that are processing distinct pages within the same address space, two threads can normally work concurrently to perform their respective functions. For example, thread 1 is taking a page fault on page A while thread 2 is attempting to page fix page B. Neither thread has any dependency on the other, other than that they share the same DAT structures. In the embodiments described herein, both threads can concurrently process their respective pages by obtaining shared serialization on the virtual memory translation structures and locking the individual pages. As long as each thread locks a page that isn't already locked, the threads can perform their functions concurrently. When a thread encounters a locked page, it must drop shared serialization and reobtain exclusive serialization, locking down the entire address space. The same approach may also be taken for larger page sizes (e.g., in z/Architecture, 1 MB pages) or in the case of a segment where there is no page table associated with it. In this case, the locking occurs at the segment entry instead of the page table entry.

An embodiment provides concurrent virtual memory management in a system having a large number of computer processing units (CPUs). The concurrent virtual memory management provides a scheme that allows concurrency for certain high performance sensitive real memory storage tasks while allowing other less performance sensitive functions to lock down an entire address space without requiring any code modifications.

To this end, the address space lock is converted into a shared/exclusive lock. The performance sensitive real storage management functions can be changed to obtain this lock shared and still be serialized with any existing functions which continue to obtain the address space lock in exclusive mode.

Figure 2A:
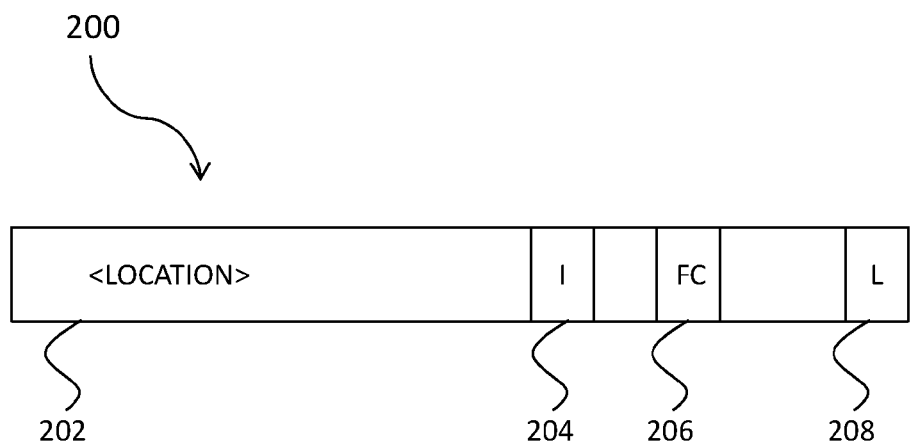
FIG. 2A depicts a sample segment table entry in accordance with an embodiment.

A function (e.g., page fault) that uses shared address space level locking needs to have a way to serialize the page being faulted on with other units of work (e.g., another page fault on the same page from a different thread). A single bit is used in both the Page Table Entry (PTE), and Segment Table Entry (STE). These bits are referred to herein as PTELock and STELock, respectively. As shown in FIG. 2A, a segment table entry 200 includes a field 202 for location, an invalid (I) bit 204, a 1 MB page backing (FC) bit 206, and a lock (L) bit 208. The location field stores the real address of the page table frame when I=0 and FC=0. The location field stores the real address of a 1 MB frame when I=0 and FC=1 (storage is mapped as a 1 MB page and backed with a 1 MB frame). The location indicates an external location of a 1 MB page when I=1 and FC=1. Thus, the FC bit 206 distinguishes how the memory management unit of the hardware is to interpret the DAT structure. The lock bit L may be set when FC=1 (mapped to a 1 MB page) or I=1 (segment is invalid and does not point to a page table).

Figure 2B:
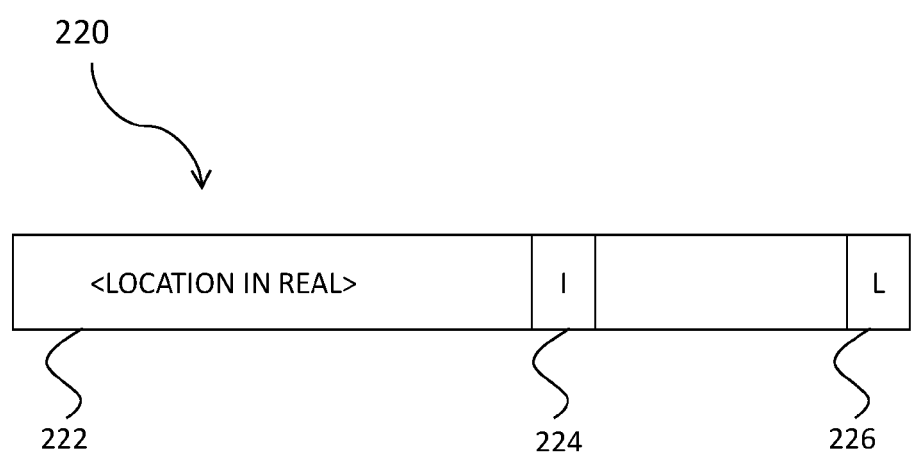
FIG. 2B depicts a sample page table entry in accordance with an embodiment.

In FIG. 2B, a page table entry (PTE) 220 is shown. The page table entry 220 includes a field for location 222, an invalid (I) bit 224, and a lock (L) bit 226. Alternatively, if the data is in external storage (e.g., auxiliary storage), the field for location 222 may hold the address for the auxiliary storage. In FIG. 2B, the location is the real address of a page when I=0. If the data is in external storage, the location field 222 holds the external location in auxiliary storage. If I=1, the page is invalid, and if L=1, the page is locked.

When the address space lock is held shared, the storage management function (e.g., page fault processing) can serialize the lowest valid level in the DAT tables mapping a virtual address by setting either the PTELock or STELock bit using a serializing instruction such as Compare and Swap in z/Architecture. If the Compare and Swap instruction fails to lock either the page or the segment, meaning that there is some other thread which is currently processing the same page or segment, the function must drop the address space lock that was held shared and reobtain it exclusive. This forces the requester to wait until the unit of work that is currently processing the page or segment to complete their processing by virtue of the fact that they hold the address space lock shared.

Since only the lowest valid DAT structure is locked, locking the segment is only applicable when there is no page table (i.e., when it is the lowest DAT structure in the hierarchy that maps the target virtual address). Once a page table real address is inserted into a locked segment, the STELock bit is no longer applicable since a page table maps the segment and other threads may lock and processes pages within the segment. Additionally, when shared address space level serialization is in effect, a STE cannot be invalidated if it points to a page table because other units of work which hold the address space lock shared may also be accessing the page table and may have locked pages to which the page table maps. So if one were to view DAT structures as a tree, branches may only be added to a node holding shared address space serialization and locking the node, but removing branches requires exclusive serialization.

Figure 3:
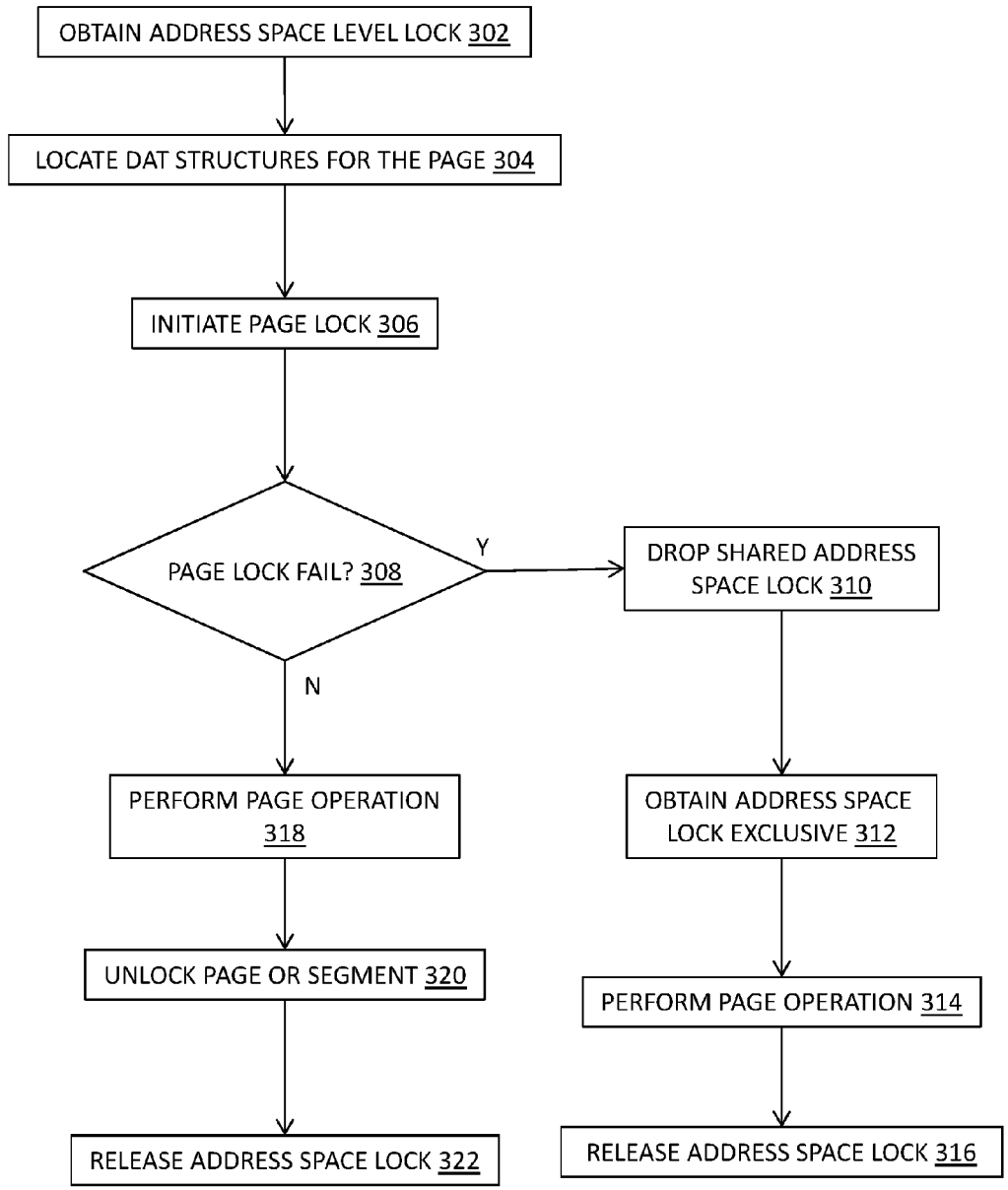
FIG. 3 depicts a flow diagram of a process for performing a page operation using the memory management techniques in accordance with an embodiment.

FIG. 3 describes a process for implementing operations using the exemplary memory management techniques. FIG. 3 describes a process for performing a page function.

In block 302, an address space level lock shared is obtained shared to partially serialize the DAT tables associated with the page. Once obtained, the DAT tables down to the next to lowest DAT structure is guaranteed to exist. For example, if a 4k page is being processed, the page table will remain intact while the shared address space lock is held, although the entries in the page table may change. Similarly, if a 1 MB page is being processed, the segment table will remain intact, but the entries may change.

At block 304, the DAT structures for the page are located, and a page lock is initiated at block 306.

At block 308, it is determined whether the page is already locked (i.e., whether the page lock initiation in block 306 failed). If the page lock initiation failed, the shared address space lock is dropped at block 310, and the address space lock exclusive is obtained in block 312. This involves waiting for all shared holders of the address space lock to release the lock. The page operation is performed in block 314, and the address space lock is dropped in block 316.

If the unit of work successfully locked the page or segment the page operation can be performed. After the operation completes, the page or segment is unlocked in block 320, and the address space lock is released in block 322. The page operation performed (blocks 314 and 318) may include resolving a page fault, a page fix/unfix, a page steal, etc.

Segment fault processing using the exemplary memory management techniques is very similar to the page fault processing described in FIG. 3 above, with the exception that the segment may either be backed with a 1 MB frame or a page table, depending on the attributes of the storage system and the availability of 1 MB frames. In the case where the segment is backed by a page table, the segment is no longer the lowest level DAT structure in the DAT tree and thus the lock bit L in the segment table entry becomes meaningless when the segment table entry points to a page table.

Figure 4:
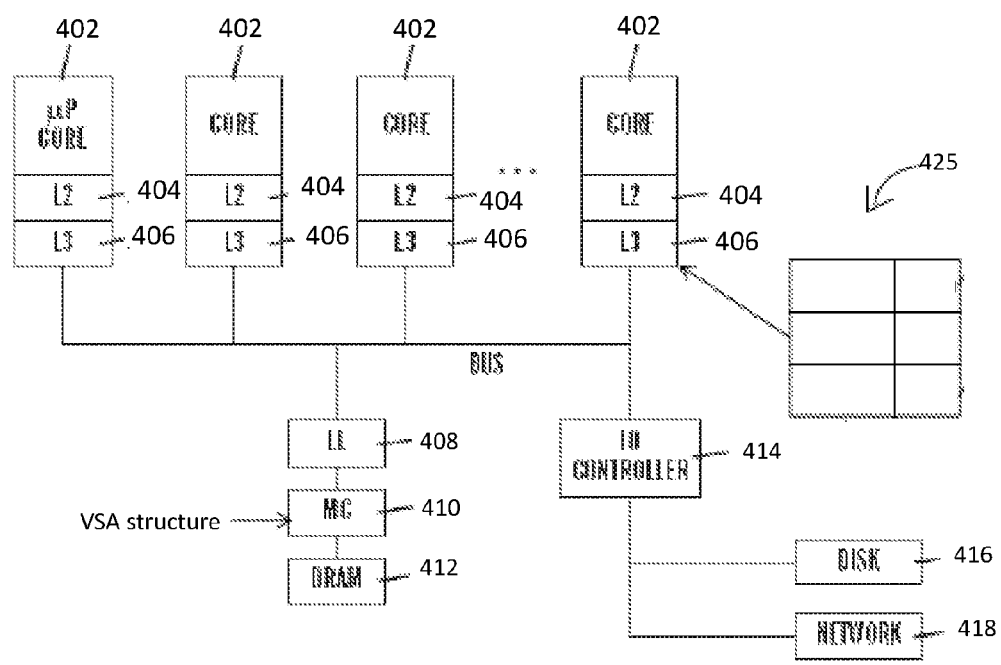
FIG. 4 is block diagram of a system upon which memory management techniques may be implemented in accordance with an embodiment.

FIG. 4 depicts a block diagram of a multi-processor system 400 upon which the exemplary memory management functions may be implemented in an embodiment.

The system in FIG. 4 includes several execution units or core processors 402, with each core processor 402 having its own dedicated high-level caches (L1 cache not shown, L2 cache 404, and L3 cache 406). Each core processor 402 is connected, via a bus to a lower level (LL) cache 408 and to an I/O controller 414. In the embodiment shown in FIG. 4, the I/O controller 414 is in communication with a disk drive 416 (e.g., a hard disk drive or "HDD", which may be an auxiliary storage location) and a network 418 to transmit and/or to receive data and commands. Also, the lower level cache 408 is connected to a memory controller 410 (also referred to herein as storage manager). The memory controller 410 operates according to the VSA structure (see, e.g., FIGS. 1A-1B).

As shown in FIG. 4, tables 425 (region, segment, and page) may reside in one or more caches, and is shown as part of one of L3 caches 406 for illustrative purposes. In an embodiment, the memory controller 410 obtains a lock on a page or segment in memory. The lock obtained corresponds to one of the lock shared and lock exclusive functions in order to perform a page operation.

In an embodiment, operating systems are executed on the core processors 402 to coordinate and provide control of various components within the core processors 402 including memory accesses and I/Os. Each core processor 402 may operate as client or as a server. The storage manager may function through respective operating systems.

In an embodiment, instructions for an operating system, application and/or program are located on storage devices, such as disk drive 416, that are loaded into main memory (in the embodiment shown in FIG. 4, the main memory is implemented by DRAM 412) for execution by the core processor 402. The processes performed by the core processor 402 are performed using computer usable program code, which may be located in a memory such as, main memory (e.g., DRAM 412), LL cache 408, L2 cache 404 and/or L3 cache 406. In one embodiment, the instructions are loaded into the L2 cache 404 or the L3 cache 406 on a core processor 402 before being executed by the corresponding core processor 402.

A bus is shown in FIG. 4 to connect the core processors 402 to an I/O controller 414 and the LL cache 408. The bus may be comprised of a plurality of buses and may be implemented using any type of communication fabric or architecture that provides for a transfer of data between different components or devices attached to the fabric or architecture. In addition, the input/output (I/O) controller 414 transmits data to and receives data from, a disk drive 416 and a network 418.

The multi-processor system shown in FIG. 4 may take the form of any of a number of different data processing systems including client computing devices, server computing devices, a tablet computer, laptop computer, telephone or other communication device, a personal digital assistant (PDA), or the like. In some illustrative embodiments, the system shown in FIG. 4 is a portable computing device that is configured with flash memory to provide non-volatile memory for storing operating system files and/or user-generated data, for example. In other illustrative embodiments, the system shown in FIG. 4 is any type of digital commercial product that utilizes a memory system. For example, the system shown in FIG. 4 may be a printer, facsimile machine, flash memory device, wireless communication device, game system, portable video/music player, or any other type of consumer electronic device. Essentially, the system shown in FIG. 4 may be any known or later developed data processing system without architectural limitation.

The example memory device described herein is a DRAM 412; however, other types of memory may be utilized for main memory in accordance with an embodiment. For example, the main memory may be a static random access memory (SRAM) or a flash memory and/or it may be located on a memory module (e.g., a dual in-line memory module or "DIMM") or other card structure. Further, as described herein, the DRAM 412 may actually be implemented by a plurality of memory devices.

Technical effects and benefits include techniques for supporting intra-address space level parallelism for the performance critical parts of address space level storage management. Techniques also provide a means of introducing changes in a piecemeal manner so that an agile software development process can be employed.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   obtaining, via a storage manager of an operating system for a memory system that is configured for access by a plurality of computer processing units, exclusive access to an entry in a DAT table either by obtaining an address space lock exclusive or obtaining an address space lock shared, wherein a lock bit is configured in the DAT table and supports both address lock shared and address lock exclusive functions; and locking a segment, wherein a backing bit and an invalid bit are configured in a segment table entry of the memory system, and wherein when a lock is held on a segment corresponding to the segment table entry, a location field of the segment table entry is based at least in part on respective values of the backing bit and the invalid bit such that;

when the invalid bit is 0 and the backing bit is 0, the location field of the segment table entry holds a real address of a page table frame;

when the invalid bit is 0 and the backing bit is 1, the location field of the segment table entry holds a real address of a 1 MB frame; and when the invalid bit is 1 and the backing bit is 1, the location field of the segment table entry holds a real address of a 1 MB page in an auxiliary storage location.

2. The method of claim 1, wherein the DAT table is at least one of:

a segment table, wherein the lock bit is set in the segment table entry of the segment table; and a page table, wherein the lock bit is set in a corresponding page table entry of the page table.

3. The method of claim 1, wherein upon determining that a page subject to the address space lock shared is already locked, the address space lock shared is dropped, and the address space lock exclusive is obtained prior to performing a corresponding task by a computer processing unit.

4. The method of claim 3, wherein the address space lock exclusive is released subsequent to performing the corresponding task by the computer processing unit.

5. The method of claim 1, wherein upon determining that a page subject to the address space lock shared is not locked, the page is locked, a corresponding task is performed by a computer processing unit, the page is unlocked, and the address space lock shared is released.

6. The method of claim 1, wherein the tasks include at least one of a page fault operation, a page fix operation, a page unfix operation, a segment fault, and a page steal operation.

7. The method of claim 1, wherein when the address space lock is held shared, a storage management function serializes, via a serialization instruction, a lowest valid level in the DAT table mapping a virtual address by setting a corresponding one of the lock bits in a segment table entry and a page table entry.

* * * * *